US010062207B2

(12) United States Patent
Huang et al.

(10) Patent No.: US 10,062,207 B2
(45) Date of Patent: Aug. 28, 2018

(54) METHOD AND SYSTEM FOR RECONSTRUCTING A THREE-DIMENSIONAL MODEL OF POINT CLOUDS

(71) Applicant: SHENZHEN INSTITUTES OF ADVANCED TECHNOLOGY CHINESE ACADEMY OF SCIENCES, Shenzhen (CN)

(72) Inventors: Hui Huang, Shenzhen (CN); Shihao Wu, Shenzhen (CN); Wei Sun, Shenzhen (CN); Pinxin Long, Shenzhen (CN); Minglun Gong, Shenzhen (CN); Daniel Cohen-Or, Tel Aviv (IL); Oliver Martin Deussen, Constance (DE)

(73) Assignee: SHENZHEN INSTITUTES OF ADVANCED TECHNOLOGY CHINESE ACADEMY OF SCIENCES, Shenzhen (CN)

( * ) Notice: Subject to any disclaimer, the term of this patent is extended or adjusted under 35 U.S.C. 154(b) by 0 days.

(21) Appl. No.: 15/342,267

(22) Filed: Nov. 3, 2016

(65) Prior Publication Data
US 2017/0053438 A1 Feb. 23, 2017

Related U.S. Application Data

(63) Continuation of application No. PCT/CN2014/084701, filed on Aug. 19, 2014.

(30) Foreign Application Priority Data

Jun. 13, 2014 (CN) .......................... 2014 1 0264099

(51) Int. Cl.
*G06T 17/20* (2006.01)
*G06T 19/20* (2011.01)

(52) U.S. Cl.
CPC .............. *G06T 17/20* (2013.01); *G06T 19/20* (2013.01); *G06T 2200/08* (2013.01); *G06T 2210/56* (2013.01)

(58) Field of Classification Search
None
See application file for complete search history.

(56) References Cited

FOREIGN PATENT DOCUMENTS

| CN | 102722907 A | 10/2012 |
|---|---|---|
| CN | 103489218 A | 1/2014 |

*Primary Examiner* — Vu Nguyen
(74) *Attorney, Agent, or Firm* — Hemisphere Law, PLLC; Zhigang Ma

(57) ABSTRACT

A method for reconstructing a three-dimensional model of point clouds includes following steps: a, scanning to obtain point clouds of an object required for a three-dimensional model reconstruction; b, analyzing quality of the obtained point clouds; c, computing a new scanning view based on the analyzed point clouds; d, scanning according to the new scanning view and updating the point clouds of step a based on point clouds obtained by the scanning according to the new scanning view in real time; and e, reconstructing a three-dimensional model according to the point clouds updated in real time. The invention further relates to a system for reconstructing a three-dimensional model of point clouds. The invention can realize full automatic reconstruction of a three-dimensional model and create a model of point clouds with high quality. In addition, the invention is easy to implement and can achieve high efficiency.

7 Claims, 2 Drawing Sheets

METHOD AND SYSTEM FOR RECONSTRUCTING A THREE-DIMENSIONAL MODEL OF POINT CLOUDS

TECHNICAL FIELD

The invention relates to a method and a system for reconstructing a three-dimensional model of point clouds.

DESCRIPTION OF RELATED ART

A computerized three-dimensional model plays a critical role in the foundation of modern lives (e.g., games, movies and virtual reality, etc.) and production activities (e.g., 3D printing, reverse engineering and digital cities, etc.). A conventional manual three-dimensional modeling is far from satisfying increasing demands of mankind, and a bottleneck of the development is lack of a fast automatic modeling method. Although the three-dimensional point cloud scanning technique has been developed for more than twenty years, it still needs to take a great deal of time to scan a model and obtain high quality point cloud data even for a veteran with professional equipment.

Shortcomings of the conventional technique are summarized as follows.

First, reconstruction of a surface is overly depended upon an existing point cloud. It is required by the conventional technique that the reconstruction of the curved surface has to be based on the existing point cloud. The manner has two flaws albeit high in efficiency. One flaw is that in positions full of details for an object, they are covered by a small amount of point clouds during initial scanning and a curved surface can be constructed, but more scanning with various angles is in need for obtaining enough point clouds to restore its original appearance; however the conventional technique supposes that the point cloud data capable of reconstructing sections of a curved surface are good enough and thus additional scanning is unnecessary, so that numerous details and sharp features are lost. The other one flaw is that regarding to a model with a relatively complicated topology structure (e.g., a human body, a tree or a handicraft decoration etc.), a curved surface formed with fragmentary point clouds according to the conventional curved surface reconstruction method is probably incorrect, but the conventional technique assumes the curved surface as formed is correct and therefore only a model with a simple outline can be processed.

Second, quality of existing point clouds will not be analyzed. It is well known that the point clouds have been scanned is generally accompanied with massive noise, outliers and holes under the influence of accuracy of a scanner, disturbance from surrounding, and shield as well as material of the object to be scanned. The conventional automatic scanning technique does not process and analyze inherent flaws of the point cloud data, and only simply uses the extent of point clouds covering the source model as guidance, and therefore it is for sure to have a considerable difference between the automatically scanned point cloud model and the real model.

Third, work efficiency for stitching and updating point clouds is low. The stitching of the point clouds indicates one of two (or multiple) point cloud data scanned from various views is translated or rotated to coincide the overlapped sections in space and then form a rational entirety according to their overlapping information. Conventional point cloud stitching techniques are mostly derived from an iterative closest point algorithm. It is unreliable without artificial assistance due to fragmentary scanning, massive noise and noisy spots at featured positions of the model. Moreover, the conventional technique directly adds all newly scanned point cloud data in the whole point cloud model, which would cause the volume of data to be excessively large or data for a local area to be redundant.

SUMMARY

Accordingly, it is necessary to provide a method and a system for reconstructing a three-dimensional model of point clouds.

Specifically, the invention provides a method for reconstructing a three-dimensional model of point clouds. The method includes: (a) scanning for obtaining point clouds of an object required for a three-dimensional model reconstruction; (b) analyzing quality of the obtained point clouds; (c) calculating a new scanning view based on the analyzed point clouds; (d) scanning according to the new scanning view and updating the point clouds obtained in the step (a) in real time based on point clouds obtained by the scanning according to the new scanning view; (e) reconstructing a three-dimensional model according to the obtained point clouds updated in real time.

In an embodiment, the method further includes a step between the step (d) and the step (e) that judging whether a termination condition is satisfied or not. If the termination condition is satisfied, the step (e) can be executed; whereas if the termination condition is not satisfied, the step (a) can be returned.

In an embodiment, the step (b) includes: preprocessing the obtained point clouds on noise reduction; constructing a distance field according to the preprocessed point clouds and performing an isosurface sampling of the distance field to obtain isosurface sampled points; and calculating a confidence score of each of the isosurface sampled points.

In an embodiment, the step (c) includes: generating a scanning viewing vector field according to the confidence score of each of the isosurface sampled points; selecting a next scanning view according to the scanning viewing vector field; and forming a scanning path according to the next scanning view.

In an embodiment, the step (d) includes: stitching the point clouds by a method for confidence score weighting; and adding the point clouds by a method for confidence score probability.

In an embodiment, the termination condition is a global average confidence score of the isosurface sampled points being at a stable state.

The invention further provides a system for reconstructing a three-dimensional model of point clouds. The system includes an obtaining module, an analyzing module, a calculating module, an updating module, a judging module and a reconstructing module. The obtaining module is configured to scan for obtaining point clouds of an object required for a three-dimensional model reconstruction. The analyzing module is configured to analyze quality of the obtained point clouds. The calculating module is configured to calculate for obtaining a new scanning view based on the analyzed point clouds. The updating module is configured to scan according to the new scanning view and update the point clouds obtained by the obtaining module in real time based on point clouds obtained by the scan according to the new scanning view. The reconstructing module is configured to reconstruct a three-dimensional model according to the obtained point clouds updated in real time.

In an embodiment, the system further includes a judging module. The judging module is configured to judge whether a termination condition is met or not. If the termination condition is met, the reconstructing module reconstructs the three-dimensional model; whereas if the termination condition is not met, the obtaining module is returned to continue to obtain the point clouds.

In an embodiment, the analyzing module is specifically configured to: preprocess the obtained point clouds on noise reduction; construct a distance field according to the preprocessed point clouds and perform an isosurface sampling of the distance field to obtain isosurface sampled points; and calculate a confidence score of each of the isosurface sampled points.

In an embodiment, the calculating module is specifically configured to: generate a scanning viewing vector field according to the confidence score of each of the isosurface sampled points; select a next scanning view according to the generated scanning viewing vector field; and form a scanning path according to the next scanning view.

In an embodiment, the updating module is specifically configured to: stitch the point clouds by a method for confidence score weighting; and add the point clouds by a method for confidence score probability.

In an embodiment, the termination condition is a global average confidence score of the isosurface sampled points being at a stable state.

All in all, the method and the system for reconstructing a three-dimensional model of point clouds according to the invention can realize fully automatic scanning and reconstruction of three-dimensional model, a point cloud model with high quality consequently is created by tentative curved surface reconstruction prediction, comprehensive quality analysis to the existing point cloud, planning of the scanning path and automatic scanning and stitching to sections with low confidence scores, and meanwhile the invention is easy to implement and can achieve high efficiency.

DETAILED DESCRIPTION OF PREFERRED EMBODIMENTS

Specific embodiments will be described in detail with reference to the accompanying drawings as follows to further illustrate the invention.

Figure 1:
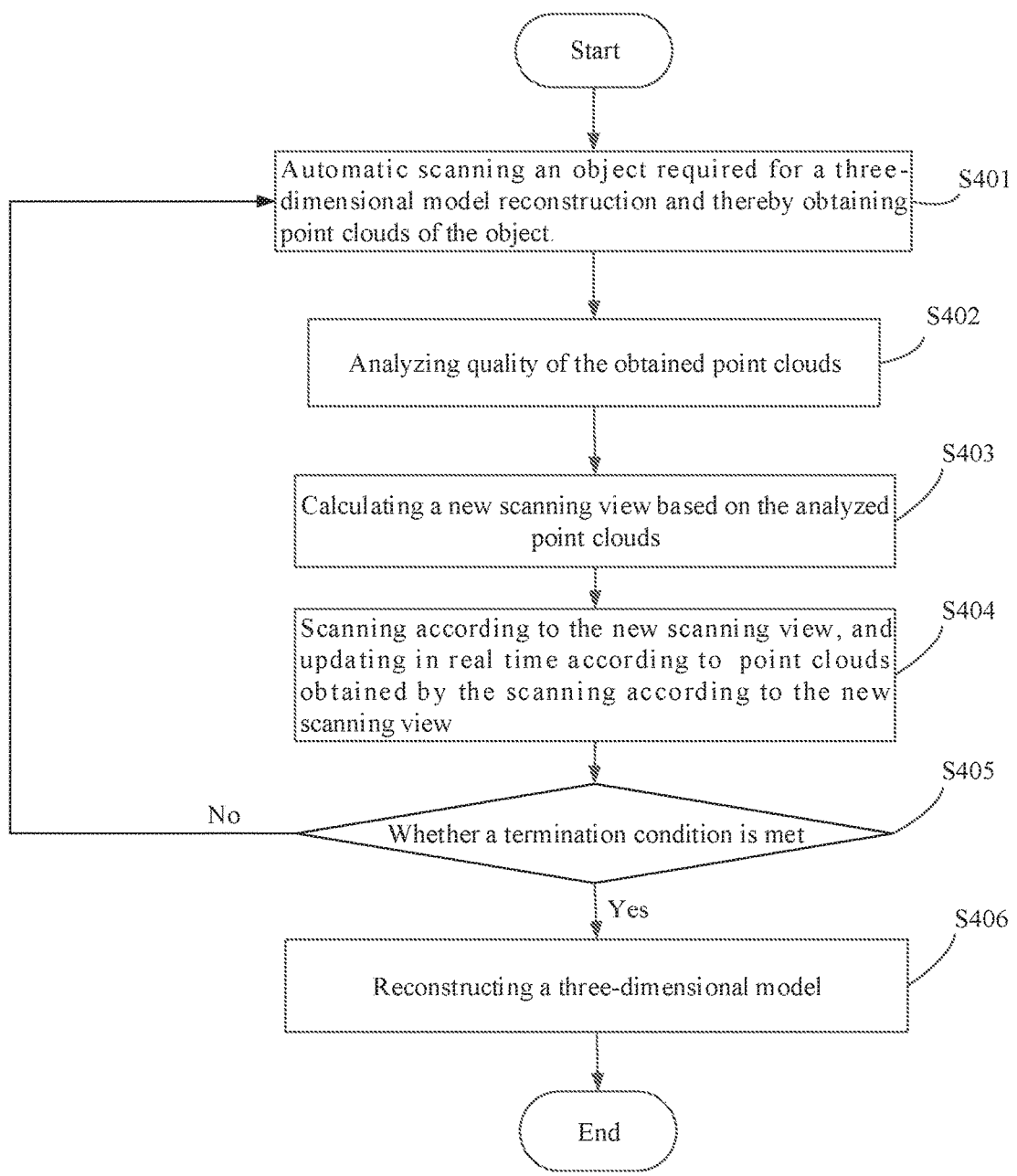
FIG. 1 is a flowchart of a method for reconstructing a three-dimensional model of point clouds according to the invention.

Referring to FIG. 1, FIG. 1 is a method for reconstructing a three-dimensional model of point clouds according to a preferred embodiment of the invention.

Step S401, automatically scanning an object required for three-dimensional model reconstruction and thereby obtaining point clouds of the object.

Step S402, analyzing quality of the obtained point clouds. It is specific as follows.

First, the obtained point clouds are preprocessed on noise reduction to filter massive noise and stray points in the point clouds, so as to optimize the point clouds.

Second, a distance field is constructed according to the preprocessed point clouds, and an isosurface sampling is performed to the distance field so as to obtain isosurface sampled points.

In particular, a point cloud curved surface reconstruction algorithm of the illustrated embodiment adopts an implicit reconstruction, whose core is to construct a field based on a distance implicit function with positive and negative (hereinafter referred to as distance field). In a given point cloud model, each point x in space has a corresponding value $f(x)$ in the field. If x is at outside of the point cloud model, $f(x)<0$; otherwise, $f(x)>0$; if $f(x)=0$, it means the point is on a surface of the point cloud model. The illustrated embodiment obtains sampled points of positions corresponding to $f(x)=0$ in the space and then connects the sampled points to create a curved isosurface.

A Poisson equation is used to solve the distance field: for any input point set, an original question is transformed to be solving a Poisson equation and thereby a basis function set based on octree can be obtained. Accordingly, for any point x in space, a corresponding distance implicit functional value $f(x)$ can be rapidly obtained by mixing basis functions.

Extracting and sampling of isosurface: a closed isosurface mesh is constructed at $f(x)=0$ in the distance field by a marching cube technique. Quality of the isosurface mesh is evaluated by confidence score, from a viewpoint of discrete realization, it is to use a Poisson-disk technique to uniformly sample points (the amount of sampled points is 5000 in the illustrated embodiment) on the curved surface mesh, and afterwards a confidence score of each of the points is calculated (a value range is 0-1). In order words, for positions with low confidence scores, geometry and topology structure information are relatively sufficient and thus additional scanning is unnecessary. In the following, the isosurface sampled points are referred to as iso-points, also called as $s_k$.

Third, each of the iso-points is performed with a confidence score calculation.

Specifically, different methods firstly are used to calculate a missing rate of point cloud data at the point (i.e., a confidence score $f_g$ based on distance field gradient analysis) and a possibility of the point belonging to a detail part (i.e., a confidence score $f_s$ based on smoothness analysis). After that, the two confidence scores are multiplied to be mixed as a final confidence score $f_k = {}^*f_s$.

For the confidence score $f_g$ based on distance field gradient analysis: as observed from an experiment that a gradient $df(x)$ of the distance field has not been concerned in the past plays an important role, To be brief, the larger the gradient of an area, the steeper the variation of the function value is, which illustrates topologies inside and outside the area are clearer with support of sufficient data, and therefore a confidence score of the curved isosurface is higher, and vice versa. A method of calculating the gradient of the distance field is very simple, this is because the solution of the Poisson equation actually is the gradient of the distance field. In other words, each $s_k$ has a $f_g$.

For the confidence score $f_s$ based on smooth analysis: the confidence score of smooth analysis for each $s_k$ is calculated by the following method. The higher the confidence score of the smooth analysis, the more irregular the local point cloud distribution is, which is more possible to be a detail area that needs more scanning. $n_k$ is a normal vector of $s_k$, $\Omega_k$ represents K numbers of adjacent points of $s_k$ (i.e., the nearest K numbers of already-scanned points q adjacent thereto, and the number of K in the illustrated embodiment generally is 100), $h_k$ indicates a distance from the farthest kth point to $s_k$.

$$f_s(s_k, n_k) = \sum_{j \in \Omega_k} \theta(\|s_k - q_j\|)\phi(n_k, q_j - s_k)$$

$$\theta(\|s_k - q_j\|) = e^{-\|s_k - q_j\|^2/(h_k/2)^2}$$

$$\phi(n_k, q_j - s_k) = e^{-\|n_k^T(q_j - s_k)\|^2/(h_k/4)^2}$$

Step S403, obtaining a new scanning view by calculation according to the analyzed point clouds. Detailed steps are as follows.

After obtaining the confidence score of each of the iso-points, it is needed to determine a best position and orientation for placing a scanner, and the position is called as next best vie (NBV). In order to effectively set the behavior of the automatic scanning, each scanning iteratively selects multiple NBVs, and the selected NBVs are used to determine a section of the scanner next desired to move. Selection of the NBVs is guided by a viewing vector field, amplitude of each vector in the viewing vector field represents contribution of the point on the NBV, and a direction of the vector actually being the orientation of the scanner is considered as well.

Firstly, generating a scanning viewing vector field according to the confidence score of each of the iso-points as obtained above.

Each scanner in the vector field has an optimum working distance [d_near, d_far]. The scanner cannot be placed excessively close to or far away from the object. Based on the farthest working distance, an outside enclosing box B is selected, the outside enclosing box B contains all points of the target object, and the space in the outside enclosing box B is a searching space of the NBVs. The outside enclosing box B then is transformed to be three-dimensional meshes. Scores of the NBVs are merely calculated in centers of some meshes, and the meshes must be not occupied by the target object. For each empty voxel $v_i$, each of the iso-points emits a light ray to detect its visibility. By calculating the score $g(v_i)$ of NBV, it is used to evaluate if a certain point in the space is suitable to be a next scanning point.

$$g(v_i) = \max_{s_k}\{w(v_i, s_k)(1 - f(s_k))\}$$

Where $f(s_k)$ is a confidence score of the iso-point as described above and is normalized to be within a range of [0,1]; a weight $w(v_i, s_k)$ is calculated by multiplying three sub items, i.e., $w_d$ that is based on a distance, $w_o$ that is based on an orientation and $w_v$ that is based on visibility. They are shown as follows.

$$w(v_i, s_k) = w_d(s_k, v_i)w_o(s_k, v_i)w_v(s_k, v_i),$$

$$w_d(s_k, v_i) = e^{-(\|(v_i - s_k)\| - d_o)^2/(d_n/4)^2},$$

$$w_o(s_k, v_i) = e^{-(1 + n_k^T d(v_i, s_k))^2/(1 - \cos(\sigma))^2},$$

$$w_v(s_k, v_i) = \begin{cases} 1 & \text{if } s_k \text{ is visible from } v_i \\ 0 & \text{otherwise} \end{cases}.$$

In the illustrated embodiment, the optimum working distance for the scanner is $d_o \leq (d_n + d_f)/2$. The $d(v_i, s_k) = (v_i - s_k)/\|v_i - s_k\|$ represents a direction after normalization of $s_k$ pointing to $v_i$. The parameter $\sigma$ is set to be 25° by default. When a confidence score of the iso-point $s_k$ pointing to the point $v_i$ is relatively low, the score function $g(v_i)$ has a relatively high value. If a maximum value of $g(v_i)$ is obtained, the score will be recorded in a 3D vector. The optimum $s_k$ is calculated out for each of all the voxels of the outside enclosing box B to obtain a viewing field vector domain.

Secondly, determining a next scanning view by a greedy algorithm according to the generated scanning viewing vector field.

In order to select position and orientation of a scanning point for the next scanning, a position with a local maximum value in the viewing vector field (VVF) is firstly selected out to be as the position for next scanning. The VVF is divided into multiple voxels, and a point with local maximum value in each of the voxels is selected. A subset of the points with local maximum values is selected as the foundation of optimizing orientation of the scanner. When selecting the subset, an excessively closed position will be avoided, only a point in a non-adjacent mesh will be selected to be a possible next scanning position.

The greedy algorithm is used to calculate the non-adjacent point with the local maximum value. First, each voxel after division has a maximum value, and the values constitute an initial set V, if amplitude of the point is lower than a given threshold, the point will be removed from the set V. After a certain point $v_i$ is selected, the point $v_i$ will be added into a set V*, and then all points adjacent to $v_i$ in the set V will be deleted until the set V is empty.

The greedy algorithm ensures the position of every selection is non-adjacent and is a position with the maximum amplitude of remaining points. Therefore, the set V* is NBVs to be sought, and orientations of the selected positions are iso-points ($s_k$) with relatively low confidence scores. Next, an optimum scanning direction is needed to be selected so that the next scanning can cover iso-points with low confidence scores as many as possible, as well as can cover some iso-points with high confidence scores as much as possible to guarantee accuracy of registration. Hence, $d(v_i, s_k)$ is not utilized to set up the orientation of the scanner directly, and a better point $s_k'$ is selected within a local range.

$$\operatorname*{argmax}_{s_{k'} \in Y_k} \eta(s_{k'})\zeta(s_{k'}),$$

$$\eta(s_{k'}) = \max_{j \in Y_{k'}}\{w(v_i, s_j)f(s_j)\},$$

$$\zeta(s_{k'}) = \Sigma_{j \in Y_{k'}} w(v_i, s_j)(1 - f(s_j)).$$

Thirdly, forming a scanning path according to the obtained next scanning view.

In the illustrated, the obtained NBVs are arranged in clockwise order to form a specific scanning path planning.

Step S404, scanning according to the new scanning view and updating the point clouds of step S401 in real-time according to point clouds obtained by the scanning of the new scanning view. Concrete steps are as follows:

Firstly, an iterative closest point (ICP) method with confidence score weighting is used to perform point cloud stitching.

After the scanner is settled on a designated NBV precisely, newly scanned points are added in the point clouds directly, which means registration is unnecessary herein. However, in practice, registration errors may occur in reality because of moving, in order to compensate the errors, the ICP algorithm with confidence score weighting is adopted, and the weight is determined by the confidence scores of the iso-points, that is, the weight of a position is higher along with the higher confidence score.

Secondly, after the above stitching is completed, the point clouds are added by a method for confidence score probability.

After the newly scanned points and existing scanning points are registered, the newly scanned points need to be added in an existing point group. It is noted that the points include not only uncertain regions, but also certain regions. If a final objective is to create a 3D model by Poisson surface reconstruction or other manner, the points can simply be added in the existing points. However, if the objective is to generate a surface that can describe the object accurately, the extra points would raise redundancy and noisy points. Therefore, the illustrated embodiment, during adding in the point clouds, adopts a form of probability:

$$P(p_i)=(1-f(s_k))^\rho.$$

Where $s_k$ is the closest iso-point distant from $p_i$. According to the definition of the above equation, the lower $f(s_k)$ is, the more possible $p_i$ is added in. Therefore, the newly added point clouds are accumulated in the regions with the low confidence scores, which can effectively improve the quality of scanning and ensure the regions with high confidence scores are not affected. The parameter $\rho$ controls probability of point addition.

Step S405, judging whether a termination condition is met or not. The termination condition is a global average confidence score of the iso-points being at a stable state, and in the illustrated embodiment, the stable state indicates a difference of average confidence scores between two iterations is less than 0.005. If the termination condition is met, automatic scanning will be terminated and going to step S406. Whereas, if the termination condition is not met, step S401 is returned to continuing to scan.

Step S406, performing a high precision three-dimensional model reconstruction according to the point clouds obtained herein.

Figure 2:
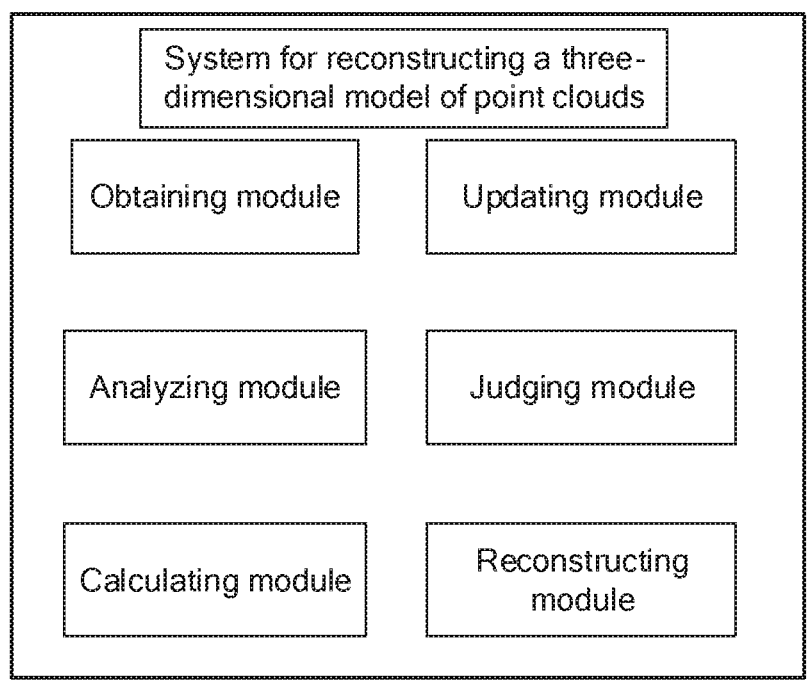
FIG. 2 is a block diagram of a system for reconstructing a three-dimensional model of point clouds according to the invention.

Referring to FIG. 2, FIG. 2 is a block diagram of a system for reconstructing a three-dimensional model of point clouds according to the invention. The system includes an obtaining module, an analyzing module, a calculating module, an updating module, a judging module and a reconstructing module. All the modules exemplarily are software modules which are stored in a memory and executable by one or more processors.

The obtaining module is configured (i.e., structured and arranged) to automatically scan an object required for a three-dimensional model reconstruction and thereby obtain point clouds of the object.

The analyzing module is configured to analyze quality of the obtained point clouds. It is specific as follows.

First, the obtained point clouds are preprocessed on noise reduction for filtering massive noise and stray points in the point clouds to optimize the point clouds.

Second, a distance field is constructed according to the preprocessed point clouds, and an isosurface sampling of the distance field is performed to obtain iso-points.

Specifically, a point cloud curved surface reconstruction algorithm of the illustrated embodiment adopts an implicit reconstruction, whose core is to construct a field based on a distance implicit function with positive and negative (hereinafter referred to as distance field). On a given point cloud model, each point x in space has a corresponding value f(x) in the field. If x is at outside of the point cloud model, f(x)<0; otherwise, if x is at inside of the point cloud model, f(x)>0;  if f(x)=0 it means the point is on the surface of the point cloud model. The illustrated embodiment obtains sampled points of positions corresponding to f(x)=0 in the space and then connects the sampled points to construct a curved isosurface.

A Poisson equation is used to solve the distance field: for any input point set, an original question is transformed to be solving the Poisson equation and then obtaining a basis function set based on octree. Accordingly, as to any point x in space, a corresponding distance implicit functional value f(x) can be rapidly obtained by mixing basis functions.

Extracting and sampling of the isosurface: a closed isosurface mesh is constituted on f(x)=0 in the distance field by a marching cube technique. Quality of the isosurface mesh is evaluated by confidence score, from a viewpoint of discrete realization, it is to use a Poisson-disk technique to uniformly sample points on the curved surface mesh (the amount of sampled point is 5000 in the illustrated embodiment), and afterwards a confidence score of each of the points is calculated (a value range is 0-1). That is, for a location with low confidence, geometry and topology structure information is relative sufficient, and thus additional scanning is unnecessary. In the following, the isosurface sampled points are called as iso-points, also referred to as $s_k$.

Third, a confidence score of each of the iso-points is calculated. Specifically, different methods firstly are used to calculate a missing rate of point cloud data at the point (i.e., a confidence score $f_g$ based on distance field gradient analysis) and a possibility of the point belonging to a detail part (i.e., a confidence score $f_s$ based on smoothness analysis). The two confidence scores then are multiplied to be mixed as a final confidence score $f_k=f_g*f_s$.

For the confidence score $f_g$ based on distance field gradient analysis: as observed from an experiment that a gradient df(x) of the distance field lacking of attention all the time has a vital function. To be brief, the larger the gradient of an area, the steeper the variation of the function value is, which illustrates topologies inside and outside of the area are clearer with support of sufficient data, and therefore a confidence score of the curved isosurface is higher, and vice versa. A method of calculating the distance field gradient is very simple, this is because the solution of the Poisson equation itself is the gradient of the distance field. In other words, each $s_k$ has a $f_g$.

For the confidence score $f_s$ based on smooth analysis: the confidence score of smooth analysis for each $s_k$ is calculated by the following method. The higher the confidence score of the smooth analysis, the more irregular the local point cloud distribution is, which is more possible to be a detail region that needs more scanning. $n_k$ is a normal vector of $s_k$, $\Omega_k$ represents K numbers of adjacent points of $s_k$ (that is the nearest K numbers of already-scanned points q in the vicinity thereof, and K in the illustrated embodiment is generally 100), and $h_k$ indicates a distance from the farthest kth point to $s_k$.

$$f_s(s_k, n_k) = \sum_{j \in \Omega_k} \theta(\|s_k - q_j\|)\phi(n_k, q_j - s_k)$$

$$\theta(\|s_k - q_j\|) = e^{-\|s_k-q_j\|^2/(h_k/2)^2}$$

$$\phi(n_k, q_j - s_k) = e^{-\|n_k^T(q_j-s_k)\|^2/(h_k/4)^2}.$$

The calculating module is configured to obtain a new scanning view by calculation according to the analyzed point clouds. The specific steps are as follows.

After obtaining the confidence score of each of the iso-points, it is necessary to determine a best position and orientation for placing a scanner, and the position is called as next best view (NBV). In order to effectively set a movement path of the automatic scanning, each scanning selects iteratively multiple NBVs, and a section of the scanner next desired to move is determined by the NBVs. Selection of the NBVs is guided by a viewing vector field, amplitude of each vector in the viewing vector field represents contribution of the point on the NBV, and a direction of the vector being the orientation of the scanner has been considered as well.

A first step is to generate the scanning viewing vector field according to the obtained confidence score of each of the iso-points.

Each scanner in the vector field has an optimum working distance [d_near, d_far]. The scanner cannot be placed excessively close to or far away from the object. Based on the farthest working distance, an outside enclosing box B is selected, the outside enclosing box B contains all points of the target object, the space in the outside enclosing box B is a searching space of the NBVs. The outside enclosing box B then is transformed to be three-dimensional meshes. Scores of the NBVs are merely calculated in centers of some meshes, and the meshed must be not occupied by the target object. To each empty voxel $v_i$, each of the iso-points emits a light ray to detect its visibility. By calculating the NBV score $g(v_i)$, it can evaluate if a point in the space is proper to be a next scanning point.

$$g(v_i) = \max_{s_k}\{w(v_i, s_k)(1 - f(s_k))\}$$

Where $f(s_k)$ is the confidence score of the iso-point and has been normalized to be within a range of [0,1]. The weight $w(v_i, s_k)$ is calculated by multiplying three sub items, i.e., $w_d$ that is based on a distance, $w_o$ that is based on an orientation and $w_v$ that is based on visibility, Which are shown as follows:

$$w(v_i, s_k) = w_d(s_k, v_i)w_o(s_k, v_i)w_v(s_k, v_i),$$

$$w_d(s_k, v_i) = e^{-(\|(v_i - s_k)\| - d_o)^2/(d_n/4)^2},$$

$$w_o(s_k, v_i) = e^{-(1 + n_k^T d(v_i, s_k))^2/(1-\cos(\sigma))^2},$$

$$w_v(s_k, v_i) = \begin{cases} 1 & \text{if } s_k \text{ is visible from } v_i \\ 0 & \text{otherwise} \end{cases}.$$

In the illustrated embodiment, the optimum working distance for the scanner is $d_o = (d_n + d_f)/2$. The $d(v_i, s_k) = (v_i - s_k)/\|v_i - s_k\|$ represents a direction after normalization of $s_k$ pointing to $v_i$. The parameter a is set to be 25° by default. When the confidence score of the iso-point $(s_k)$ pointing to the point $v_i$ is relatively low, the score function $g(v_i)$ has a relatively high value. If a maximum value of $g(v_i)$ is obtained, the score will be recorded in a 3D vector. The optimum $s_k$ is calculated for each of all the voxels of the outside enclosing box B to obtain a viewing field vector domain.

A second step is to select a next scanning view by a greedy algorithm according to the generated scanning viewing vector field.

A position and an orientation of the scanning point are selected for the next scanning. A position with a local maximum value in the viewing vector field (VVF) is firstly selected out and used as the position for next scanning. The VVF is divided into multiple voxels, and a point with a local maximum value in each of the voxels is selected. After that, a subset of the points with local maximum values is selected as a foundation of optimizing orientation of the scanner. During selecting the subset, an excessively closed position will be avoided, and only a point in a non-adjacent mesh will be selected as a possible next scanning position.

A greedy algorithm used to obtain the non-adjacent point with a local maximum value by calculation. First, each of the voxels after division has a maximum value, and the values form an initial set V, if amplitude of a point is lower than a given threshold, the point will be removed from the set V. When a point $v_i$ is selected, the point $v_i$ will be added in a set V*. Then, all points in the set V adjacent to $v_i$ will be removed until the set V is empty.

The greedy algorithm ensures the position of every selection is non-adjacent and is a position of the maximum amplitude of remaining points. Therefore, the set V* is NBVs to be sought, orientations of the selected positions are iso-points $(s_k)$ with relatively low confidence scores. Next, an optimum scanning direction is needed to be selected, so that the next scanning can cover as many iso-points with low confidence scores as possible, as well as can cover some iso-points with high confidence scores as many as possible to guarantee accuracy in reconstruction. Hence, $d(v_i, s_k)$ is not directly utilized to set the orientation of the scanner, and a better point $s_{k'}$ is selected within the local range.

$$\underset{s_{k'} \in Y_k}{\mathrm{argmax}} \eta(s_{k'})\zeta(s_{k'}),$$

$$\eta(s_{k'}) = \max_{j \in Y_{k'}} \{w(v_i, s_j)f(s_j)\},$$

$$\zeta(s_{k'}) = \Sigma_{j \in Y_{k'}} w(v_i, s_j)(1 - f(s_j)).$$

A third step is to form a scanning path according to the obtained next scanning view.

In the illustrated embodiment, the obtained NBVs are arranged in clockwise order to form a specific scanning path schedule.

The updating module is configured to scan according to the new scanning view and update the point clouds of step S401 in real-time according to point clouds obtained by scanning of the new scanning view. Specific steps are as follows.

First, an iterative closest point (ICP) method with confidence score weighting is adopted for stitching the point clouds.

After the scanner is settled on a designated NBV precisely, newly scanned points are added in the point clouds directly, which means registration is unnecessary herein. However, in practice, registration errors may occur in reality because of moving. In order to compensate the errors, the ICP algorithm with confidence score weighting is adopted, the weight is determined by confidence scores of the iso-points, that is, the weight of a position is higher along with the higher confidence score.

Second, after the stitching is completed, a method with confidence score probability is adopted for adding of point clouds.

After the newly scanned points and existing scanning points are registered, the newly scanned points need to be added in an existing point group. It is worth noticing that the points include not only uncertain regions, but also certain regions. If a final objective is to create a 3D model by Poisson surface reconstruction or other manner, the points can be simply added in the existing points. However, if the objective is to generate a surface that can describe the object accurately, the extra points would raise redundancy and noisy points. Therefore, the illustrated embodiment adopts a form of probability during adding the point clouds.

$$P(p_i)=(1-f(s_k))^\rho$$

Where $s_k$ is the closest iso-points distant from $p_i$. According to the definition of the above equation, the lower $f(s_k)$, the more possible $p_i$ is added in. The newly added point clouds are accumulates in the regions with the low confidence scores, which can effectively improve the quality of scanning and ensure the regions with high confidence scores are not affected. The parameter $\rho$ controls possibility of point addition.

The judging module is configured to judge if a termination condition is met or not. The termination condition is a global average confidence score of the iso-points being at a stable state, and in the illustrated embodiment, the stable state indicates a difference of average confidence scores between two iterations is less than 0.005. If the termination condition is met, automatic scanning is closed. If the termination condition is not met, scanning is continued.

The reconstructing module is configured to reconstruct a three-dimensional model with high precision according to the point clouds satisfying the termination condition.

Through the invention is described referring to preferred embodiments, it can be understood by a person skilled in the art that the preferred embodiments mentioned above are merely for illustrating the invention rather than limiting protection scope of the invention, any modification, equivalent substitution and improvement within the spirit and principle of invention should be included in the protection scope of the invention.

What is claimed is:

1. A method for reconstructing a three-dimensional model of point clouds, the method comprising:
    (a) scanning to obtain point clouds of an object required for a three-dimensional model reconstruction;
    (b) analyzing quality of the obtained point clouds;
    (c) calculating a new scanning view based on the analyzed point clouds;
    (d) scanning according to the new scanning view, and updating the point clouds obtained in the step (a) in real time according to point clouds obtained by the scanning according to the new scanning view; and
    (e) reconstructing a three-dimensional model according to the obtained point clouds updated in real time.

2. The method according to claim 1, further comprising a step between the step (d) and the step (e) that:
    judging whether a termination condition is met or not; wherein if the termination condition is met, the step (e) is executed; and whereas if the termination condition is not met, the step (a) is returned.

3. The method according to claim 1, wherein the step (d) comprises:
    stitching the point clouds by a method for confidence score weighting; and
    adding the point clouds by a method for confidence score probability.

4. A system for reconstructing a three-dimensional model of point clouds, the system comprising a memory stored with a plurality of software modules and one or more processors, the plurality of software modules are executable by the one or more processors and comprise an obtaining module, an analyzing module, a calculating module, an updating module, a judging module and a reconstructing module; wherein
    the obtaining module is configured to scan for obtaining point clouds of an object required for a three-dimensional model reconstruction;
    the analyzing module is configured to analyze quality of the obtained point clouds;
    the calculating module is configured to calculate new scanning views based on the analyzed point clouds;
    the updating module is configured to scan according to the new scanning views and update the point clouds obtained by the obtaining module in real time based on point clouds obtained by the scanning according to the new scanning views; and
    the reconstructing module is configured to reconstruct a three-dimensional model according to the obtained point clouds updated in real time.

5. The system according to claim 4, wherein the system further comprises a judging module configured to judge whether a termination condition is met or not, wherein
    if the termination condition is met, the reconstructing module reconstructs the three-dimensional model; and
    if the termination condition is not met, the obtaining module is returned to continue to obtain the point clouds.

6. The system according to claim 5, wherein the termination condition is a global average confidence score of the isosurface sampled points being at a stable state.

7. The system according to claim 4, wherein the updating module is specifically configured to:
    stitch the point clouds by a method for confidence score weighting; and
    add the point clouds by a method for confidence score probability.

* * * * *